Patented Feb. 1, 1949

2,460,365

UNITED STATES PATENT OFFICE 2,460,365

PRODUCTION OF INSOLUBLE SULFUR

Alvin Schallis, Jersey City, N. J., assignor to Stauffer Chemical Company, a corporation of California No Drawing. Application September 29, 1945, Serial No. 619,418

7 Claims. (Cl. 23—224)

This is a continuation in part of my application Serial Number 517,437, filed January 7, 1944, now forfeited.

This invention relates to the production of insoluble sulphur.

Sulphur soluble in carbon disulphide is termed "soluble sulphur," while that which is not soluble is termed "insoluble sulphur;" to the latter material the term "sulphur mu" is frequently employed, and for convenience I may employ this term.

If one quenches molten sulphur in cold water, a mass of sulphur is produced which, upon standing, solidfies and hardens. Upon being finely ground, it will be found that some portion of this material will be insoluble in carbon disulphide. Endres, in Patent 1,875,372, states that one-third of a sulphur so produced is insoluble in carbon disulphide, while the remainder is soluble. There is a steadily increasing demand for insoluble sulphur and today it is generally produced by extracting the soluble portion with carbon disulphide to leave as a remainder the insoluble portion. This operation is obviously involved and insoluble sulphur is, therefore, expensive as compared to ordinary sulphur. If the insoluble sulphur is permitted to stand for an extended period, particularly at a relatively elevated temperature as can be encountered in warehouse storage, it will be found that a considerable portion of the insoluble content has reverted to soluble form, thereby decreasing the value and usefulness of the material.

I have found that by treating insoluble sulphur with a small quantity of a halogen the rate of reversion of the insoluble content to the soluble form is considerably decreased. This treatment of the insoluble sulphur with halogen is effected subsequent to the formation of the insoluble sulphur. This treatment may be accomplished in several ways. Thus (1) the halogen may be added directly to the insoluble sulphur in the dry state as by passing vapors of the halogen through or over the sulphur; or (2) a slurry of the solid insoluble sulphur in a solvent for the halogen may be treated with the halogen (this may be followed by more or less complete extraction of the halogen and the soluble sulphur content present); or (3) during the process of extracting the soluble sulphur from the insoluble sulphur, the last wash of solvent may contain the halogen.

The sulphur employed as the source of insoluble sulphur can contain those organic compounds usually present as impurities in crude sulphur obtained from natural deposits in the United States. In fact, when these are present in the insoluble sulphur, a halogen seems to be more effective, possibly because the halogenated organic compounds formed with the impurities may be even more effective stabilizers than is the halogen alone. Employment of a crude rather than an extremely highly refined sulphur as the source of insoluble sulphur is, therefore, possible.

Only a very small quantity of stabilizer need be added, such small amounts that the effect can be termed catalytic, 1% and less only being required. In any case, a trace of a halogen stabilizes the sulphur. The stabilizing effect is quite pronounced for the sulphur is stable even when the halogen or halogen material is nearly all removed from the sulphur after the treatment.

Reference to a halogen includes a halogen atom, the halogen molecule, the halogen ion or a halide. The mechanism of the reaction is such that no hypotheses can be made as to the presence of intermediate activated complexes or ions, because no data is now available to indicate the course of the reaction between the halogen or halide with S mu to form stabilized S mu. In any case we are concerned only with the reactants and the final product and not with the intermediate complexes. The detailed mechanism of stabilization is complex; it may even differ as between stabilizing materials, yet the final result and final products are the same in that the product is stabilized. In any case, the halogen which has reacted with the insoluble sulphur is not readily washed out and remains with the insoluble sulphur; such a small quantity is not readily determined by analysis.

The following table indicates the stabilizing effect of various halogens when added to slurries of insoluble sulphur in carbon disulphide followed by washing with fresh carbon disulphide to remove the halogen. The test is conducted by subjecting a weighed quantity of the material to a carbon disulphide reflux stream in a Soxhlet extractor for four hours. This test provides conditions conducive to an accelerated reversion. In the carrying on of this test, the sulphur should be in finely divided form, to ensure that all soluble material is easily contacted for extraction. In determining the insoluble sulphur content and the reversion loss, a sample of the untreated sulphur to be tested is first placed in a Gooch crucible and extracted with cold carbon disulphide for a short time. The sulphur remaining is taken as being all insoluble sulphur. A second sample is then extracted with carbon disulphide in a Soxhlet extractor for four hours. If the fraction of sulphur remaining in the Gootch crucible is taken as "A" and the fraction of sulphur remaining after the four-hour extraction as "B," then the reversion loss can be expressed as follows:

$$\text{Per cent reversion loss} = \frac{100 (A-B)}{A}$$

This approximates and gives an indication of the loss which would be encountered in commercial handling of the material but under a much longer period of time.

*Table I*

| Halogen Added | Quantity Added (Based on content in slurry) | Per cent loss under 4 hours reflux with Carbon Disulphide |
|---|---|---|
| | Per cent | Per cent |
| None | | 13 |
| $S_2Cl_2$ | 1 | 1.7 |
| $Br_2$ | 1 | 1.3 |
| $I_2$ | 1 | 1.7 |

Chlorine and bromine can be used as such but these react readily with sulphur and with any carbon disulphide present to form the corresponding sulpho-halogen. For convenience, therefore, sulphur monochloride, $S_2Cl_2$ is used, when it is desired to test the effectiveness of only small quantities on a given mass of sulphur, rather than chlorine for the latter, being a gas, is harder to handle than the liquid sulphur chloride. The bromine probably was converted in part to $S_2Br_2$.

In another series of tests 60 gram quantities of insoluble sulphur (75% insoluble–25% soluble) were treated with 100 c. c. quantities of carbon bisulphide containing the stabilizer to be tested. The carbon bisulphide was then allowed to evaporate into the atmosphere so the stabilizer remained. Each dry sample was then sifted and analyzed. The following table gives the results upon treatment with the indicated stabilizer:

*Table II*

| Stabilizer | Concentration present by weight of sulphur | Per cent loss during 4-hour reflux | Monthly reversion rate at 90° F., per cent |
|---|---|---|---|
| None | | 9 | 11 |
| Iodine | 0.001 | 8 | 9 |
| Do | 0.01 | 7 | 7 |
| Do | 0.100 | 6 | 5.4 |
| Do | 1.00 | 4 | 2.2 |
| Bromine | 0.001 | 7 | 12 |
| Do | 0.01 | 7 | 8 |
| Do | 0.10 | 4 | 4.3 |
| Do | 1.00 | 0.98 | |
| $S_2Cl_2$ | 0.001 | 8 | 20 |
| Do | 0.01 | 11 | 10 |
| Do | 0.10 | 3.8 | 7 |
| Do | 1.00 | 1.6 | 3.2 |

It will be noted that the untreated sample reverted at the rate of 11% a month under conditions comparable to summer warehouse storage while the treated material reverted at only 2% to 3%.

In another series of tests, 80 gram samples of an insoluble sulphur (75% insoluble–25% soluble) were treated at room temperature (15°–20° C.) for at least 24 hours with 150 c. c. quantities of carbon bisulphide containing the indicated weight of stabilizer. The slurry was filtered and washed in each case with 500 c. c. of fresh carbon bisulphide, care being taken to press each filter cake and avoid cracks through which the bisulphide could short circuit. The washed cake was then spread out and allowed to air dry; it was then sifted through a screen to produce a uniform product.

*Table III*

| Stabilizer | Concentration, per cent by weight of sulphur | Monthly reversion rate, per cent loss at 90° F. |
|---|---|---|
| None | | 11 |
| Iodine | 1.0 | 3.3 |
| Bromine | 1.0 | 5.0 |
| $S_2Cl_2$ | 1.0 | 4.9 |

It will be observed upon comparing the results of Tables I and III with those in Table II that sulphur from which the soluble sulphur and stabilizer have been extracted is generally more stable than that in which the stabilizer is present. The stabilizing treatment is preferably effected, therefore, on the "crude" insoluble sulphur and later the stabilizer and soluble sulphur are extracted. This ensures the highest grade and most stable product.

In place of using the halogen as such one can employ any compound containing a halogen in such a linkage that, when added to the sulphur, the compound is a halogen donor to an extent sufficient to effect the stabilization through a mechanism involving probable halogen liberation. Thus one can use inorganic compounds such as titanium tetrachloride, $SOCl_2$, phosphorous oxychloride, phosphorus tri-chloride, phosphorous pentachloride, silicon tetrachloride. One can also use organic compounds which liberate at least a small quantity of halogen in contact with the sulphur such as allyl bromide, allyl chloride. All useful compounds are, in effect, halogen donors and are, therefore, merely another halogen source. On this basis, (1) the reagent should contain a halogen which can combine with the sulphur; and (2) the reagent should not contain nor form a residue detrimental to the stability (as iron or an iron sulphide as in the case of added ferric chloride; these are known to accelerate reversion). To facilitate treatment of the sulphur, it is desirable that the reagent have either an appreciable vapor pressure or else be sufficiently soluble in the solvent used to extract soluble sulphur that it can be added and substantially removed with this solvent.

I claim:

1. A process for reducing the rate of reversion of that form of sulphur which is insoluble in carbon disulphide to that form which is soluble in carbon disulphide comprising incorporating, in preformed sulphur containing at least a third by weight of said insoluble sulphur, less than about 1% of a halogen on the weight of the sulphur.

2. A process for reducing the rate of reversion of that form of sulphur which is insoluble in carbon disulphide to that form which is soluble in carbon disulphide comprising washing sulphur containing at least a third by weight of said insoluble sulphur with a solvent for the carbon disulphide soluble sulphur, the solvent containing a halogen in an amount less than about 1% of the weight of the sulphur.

3. A process for reducing the rate of reversion of that form of sulphur which is insoluble in carbon disulphide to that form which is soluble in carbon disulphide comprising treating sulphur containing at least a third by weight of insoluble sulphur with a fluid containing a halogen in an amount less than about 1% of the weight of the sulphur to stabilize the insoluble sulphur.

4. A process for reducing the rate of reversion of that form of sulphur which is insoluble in carbon disulphide to that form which is soluble in carbon disulphide comprising incorporating, in a preformed sulphur containing at least a third by weight of said insoluble sulphur, less than about 1% of a halogen on the weight of the sulphur; and extracting the sulphur with a solvent for (a) the sulphur present which is soluble in carbon disulphide and (b) the halogen to remove substantially all of the soluble sulphur present and the added halogen.

5. A process for reducing the rate of reversion of that form of sulphur which is insoluble in carbon disulphide to that form which is soluble in carbon disulphide comprising treating sulphur containing at least a third by weight of said insoluble sulphur with a fluid containing less than about 1% of a halogen on the weight of insoluble sulphur treated to stabilize said insoluble sulphur against reversion to the soluble form, and thereafter extracting the sulphur with a solvent for (a) the sulphur present which is soluble in carbon disulphide and (b) the halogen to remove substantially all of the carbon disulphide soluble sulphur present and the added halogen.

6. A process for reducing the rate of reversion of insoluble to soluble sulphur in sulphur which has been chilled from a high temperature and extracted with a solvent to remove the soluble form and which contains at least a third by weight of insoluble sulphur, the process comprising incorporating a halogen in an amount less than about 1% in said sulphur.

7. A process for reducing the rate of reversion of insoluble to soluble sulphur in preformed sulphur containing at least a third by weight of the insoluble sulphur, which comprises incorporating a halogen in an amount less than about 1% of the weight of the sulphur, and extracting from the sulphur with a solvent substantially all of the added halogen and the soluble sulphur present.

ALVIN SCHALLIS.

REFERENCES CITED

The following references are of record in the file of this patent:

UNITED STATES PATENTS

| Number | Name | Date |
|---|---|---|
| 2,061,185 | Ceccon | Nov. 17, 1936 |

OTHER REFERENCES

Berthelot, Comptes Rendus, vol. 44, pages 318–322 (1857).

Smith et al., Journal of the American Chemical Society, vol. 26, pp. 352–356 (1904).

Smith et al., Journal of the American Chemical Society, vol. 27, pp. 979–1013 (1905).